Feb. 2, 1932.                C. W. DALZELL                1,843,762
                         MOTOR CONTROL APPARATUS
                     Filed July 9, 1931        2 Sheets-Sheet 1

INVENTOR:
C. W. Dalzell,
BY
His ATTORNEY.

Feb. 2, 1932.  C. W. DALZELL  1,843,762
MOTOR CONTROL APPARATUS
Filed July 9, 1931   2 Sheets-Sheet 2

INVENTOR:
C. W. Dalzell,
BY
A. R. Vencill
His ATTORNEY.

Patented Feb. 2, 1932

1,843,762

UNITED STATES PATENT OFFICE

CLARENCE W. DALZELL, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

MOTOR CONTROL APPARATUS

Application filed July 9, 1931. Serial No. 549,698.

My invention relates to motor control apparatus, and particularly to apparatus for controlling the operating motor for a railway switch from a remote point.

One feature of my invention is the provision of means for operating the motor from a current impulse of relatively short duration sent out from a central control location, which permits the control wires to remain deenergized at all times except when the control impulse which initiates motor operation is being sent.

Another feature of my invention is the provision of means for maintaining control over the motor from the control location irrespective of the position in which the switch may remain as a result of manual operation.

I will describe two forms of apparatus embodying my invention, and will then point out the novel features thereof in claims.

Figure 1:
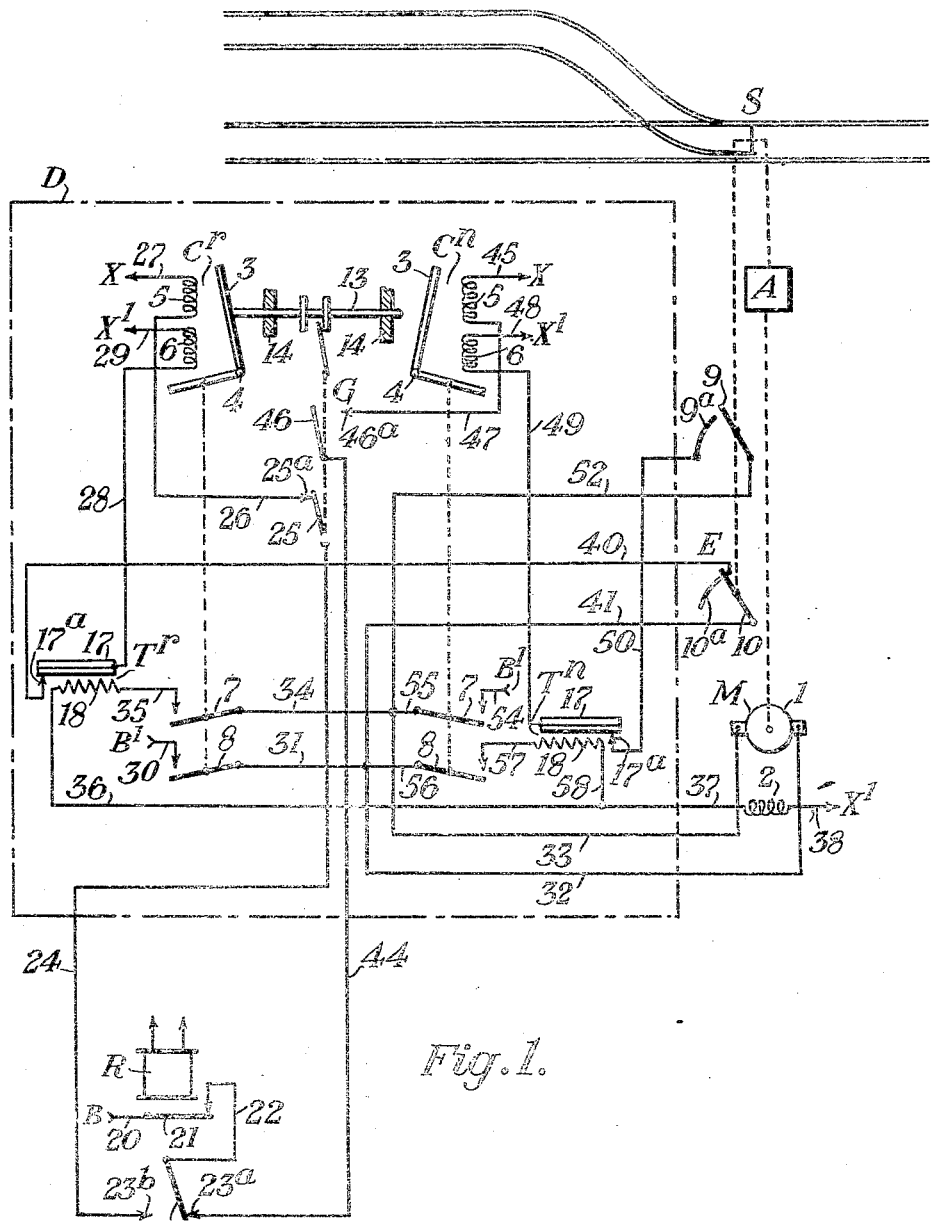
Figure 2:
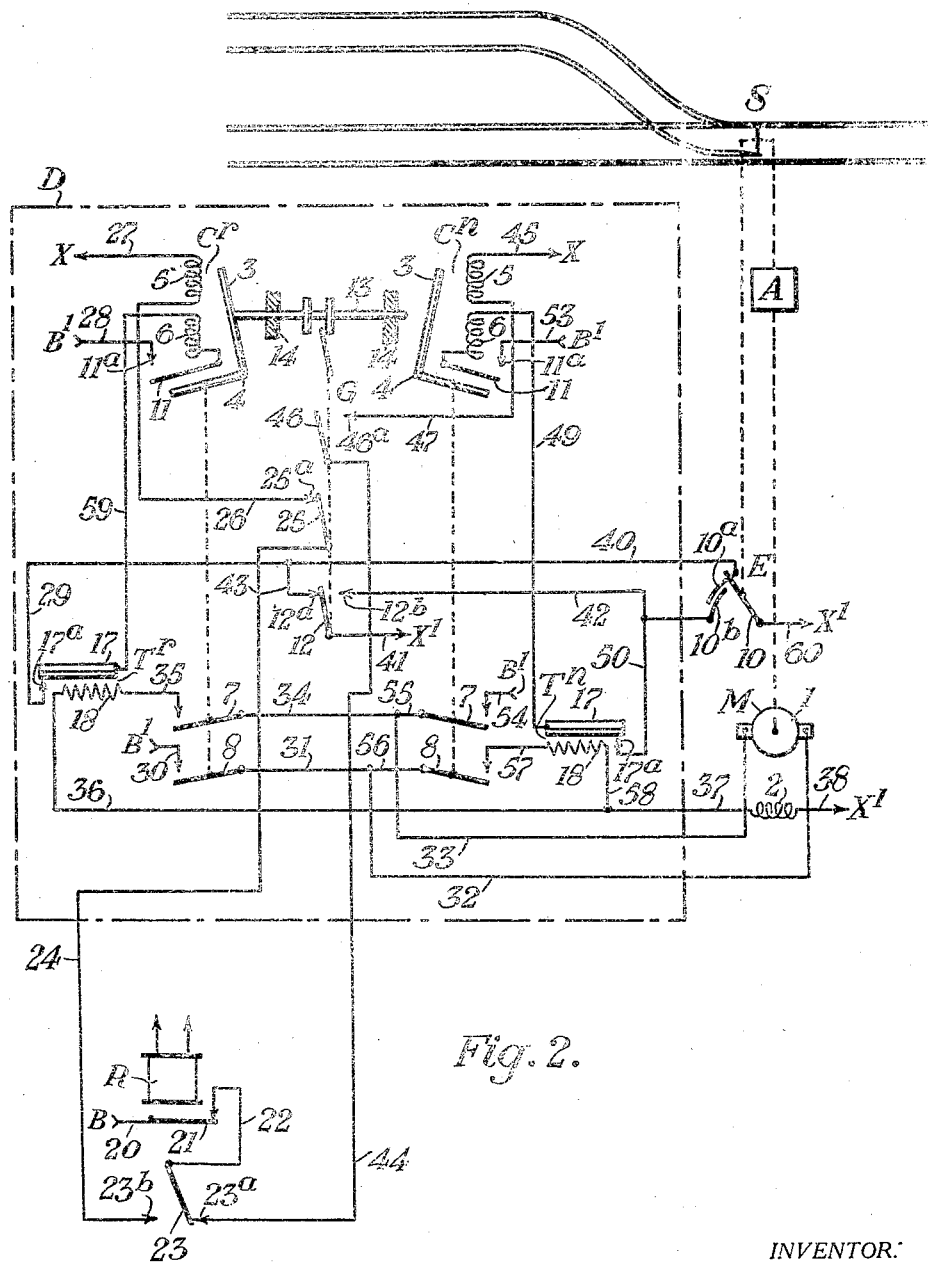

Fig. 1 of the accompanying drawings is a diagrammatic view showing one form of motor control apparatus embodying my invention applied to the control of an electric motor for operating a railway switch. Fig. 2 is a similar view showing a modified form of the apparatus illustrated in Fig. 1, and also embodying my invention.

Referring first to Fig. 1 of the drawings, the reference character S designates a railway switch which is operated by a motor M through the medium of a suitable switch-operating mechanism A. This mechanism forms no part of my present invention, and its structure is therefore not shown in the drawings.

The switch S operates a circuit controller E comprising a contact 10—10$^a$ which is closed at all times except when the switch occupies its extreme reverse position, and a contact 9—9$^a$ which is closed at all times except when the switch occupies its extreme normal position, in which latter position it is illustrated in the drawings.

The motor M is controlled by a motor controller, designated in general by the reference character D, which motor controller, in turn, is controlled by the circuit controller E and by a polarized relay R. The polarized relay R will usually be controlled from a point remote from the motor controller D, such for example, as a train despatcher's office, and may be controlled in any suitable manner as by pole-changing contacts on a manually operable switch lever.

The motor controller D, in the form here shown, comprises a normal contactor $C^n$ and a reverse contactor $C^r$. These contactors are alike and each comprises an armature 3, pivoted at 4, and controlled by a pick-up winding 5 and a holding winding 6 in a manner described hereinafter. Each armature 3 is operatively connected with two contacts 7 and 8. When winding 5 of either contactor $C^r$ or $C^n$ is deenergized, armature 3 of this contactor occupies the position in which it is illustrated in the drawings, and the associated contacts 7 and 8 are open, unless winding 6 has been energized before deenergization of winding 5. When winding 5 of either contactor is energized, however, armature 3 of this contactor is swung to a position in which the associated contacts 7 and 8 become closed. Windings 5 and 6 are so designed that winding 5 is capable of attracting armature 3 to its operated position, but winding 6 is not capable of attracting armature 3 but is capable of holding this armature in its operated position once the armature has been attracted by winding 5. The purpose of using two windings 5 and 6 on each of the contactors $C^n$ and $C^r$ is to permit a contactor to be operated from a short impulse of current supplied over the line wires and sufficient to close armature 3 when winding 5 is energized, without making it necessary to maintain the supply of energy to winding 5 during the total time that motor M is being operated. The line wires become deenergized as soon as armature 3 is closed, and armature 3 in closing contacts 7 and 8 applies energy from a local source to winding 6 to hold armature 3 in its closed position until the motor M has completed its operation or until an abnormal condition has caused the thermal relay contact to open.

The armatures 3 of the contactors $C^n$ and $C^r$ are controlled by an interlocking rod 13 in such manner that the armature 3 of one contactor cannot be moved to the position in which its associated contacts are closed unless the armature 3 of the other contactor occupies the position in which its associated contacts are open. The interlocking rod 13 is mounted to slide in suitable holes formed in two fixed abutments 14, and is arranged to operate a circuit controller G. The circuit controller G, in the form here shown, comprises a contact 25—25$^a$ which becomes closed when armature 3 of contactor C$^n$ is moved to the position where its associated contacts become closed, and which subsequently remains closed until just after armature 3 of contactor C$^r$ has been moved to the position where its associated contacts become closed. The circuit controller G also comprises a contact 46—46$^a$ which becomes closed when armature 3 of contactor C$^r$ is moved to the position where its associated contacts become closed, and which subsequently remains closed until just after armature 3 of contactor C$^n$ has been moved to the position where its associated contacts become closed.

The motor controller D also comprises two thermal relays T$^n$ and T$^r$, each comprising a thermo-sensitive device and a heating element 18 for heating the device. As here shown, each thermo-sensitive device is a bi-metallic strip 17 arranged in such manner that the free end of the strip will deflect upwardly when the associated heating element 18 is supplied with current, the magnitude of which exceeds the normal operating current for motor M. Each bimetallic strip 17 operates a contact 17—17$^a$ which is normally closed, but which becomes opened when the associated bimetallic strip 17 is deflected.

As shown in the drawings, switch S occupies its normal position, so that contact 9—9$^a$ of circuit controller E is open, and contact 10—10$^a$ of circuit controller E is closed. Motor M is deenergized. Contactors C$^n$ and C$^r$ are both deenergized, and the contacts 7 and 8 of these contactors are open but contact 25—25$^a$ of circuit controller G is closed. Thermal relays T$^n$ and T$^r$ are both deenergized, and contact 17—17$^a$ of both of these relays is therefore closed. Polarized relay R is energized in its normal direction so that its front contact 21 and its normal contact 23—23$^a$ are closed. I will now assume that with the parts in the positions just described the train despatcher wishes to reverse switch S. To do this, he reverses relay R so that relay R opens its normal contacts 23—23$^a$ and closes its reverse contacts 23—23$^b$. Current is then supplied to winding 5 of contactor C$^r$ from the terminals B and X of a suitable source of current not shown in the drawings over a pick-up circuit which passes from terminal B, through wire 20, front contact 21 of relay R, wire 22, reverse contact 23—23$^b$ of relay R, wire 24, contact 25—25$^a$ of circuit controller G, wire 26, winding 5 of contactor C$^r$, and wire 27 to terminal X. As a result, winding 5 of contactor C$^r$ becomes energized, so that armature 3 of this contactor is moved to the position in which its associated contacts 7 and 8 become closed. When armature 3 is moved to this position, contact 25—25$^a$ of circuit controller G is opened, thus interrupting the pick-up circuit just traced for winding 5 of contactor C$^r$, but not until after contacts 7 and 8 of contactor C$^r$ are closed, thus energizing winding 6 by virtue of a circuit which passes from terminal B$^1$ of a local source, through wire 30, contact 8 of contactor C$^r$, wire 31, wire 41, contact 10—10$^a$ of circuit controller E, wire 40, contact 17—17$^a$ of thermal relay T$^r$, wire 28, winding 6 of contactor C$^r$, and wire 29 to terminal X$^1$. When contacts 7 and 8 of contactor C$^r$ become closed, a circuit for motor M is completed, and current flows from terminal B$^1$, through wire 30, contact 8 of contactor C$^r$, wires 31 and 32, armature 1 of motor M, wires 33 and 34, contact 7 of contactor C$^r$, wire 35, heating element 18 of thermal relay T$^r$, wires 36 and 37, field winding 2 of motor M, and wire 38 to terminal X$^1$. Motor M therefore operates to move switch S from its normal to its reverse position. When the switch reaches its full reverse position, contact 10—10$^a$ of circuit controller E opens, thereby interrupting the circuit previously traced for winding 6 of contactor C$^r$, so that contactor C$^r$ becomes deenergized and opens its contacts 7 and 8. When contacts 7 and 8 of contactor C$^r$ are opened, the circuit just traced for motor M is interrupted and the motor stops. All parts are then deenergized.

If, after the switch has reached its full reverse position, the train despatcher wishes to restore the switch to its normal position, he restores relay R to its normal position in which it is illustrated in the drawings. Since contact 46—46$^a$ of circuit controller G is now closed, a pick-up circuit for winding 5 of contactor C$^n$ is completed from terminal B, through wire 20, front contact 21 of relay R, wire 22, normal contact 23—23$^a$ of relay R, wire 44, contact 46—46$^a$ of circuit controller G, wire 47, winding 5 of contactor C$^n$, and wire 45 to the other terminal X. Winding 5 of contactor C$^n$ therefore becomes energized so that armature 3 of this contactor is moved to the position in which its associated contacts 7 and 8 are closed. When armature 3 is moved to this position, contact 46—46$^a$ of circuit controller G opens and interrupts the pick-up circuit just traced for winding 5 of contactor C$^n$, but not until after contacts 7 and 8 of contactor C$^n$ are closed, thus energizing winding 6 by virtue of a circuit which passes from terminal B$^1$ of the local source, through wire 54, contact 7 of contactor C$^n$, wire 55, wire 52, contact 9—9$^a$ of circuit controller E, wire 50, contact 17—17$^a$ of thermal relay T$^n$, wire 49, winding 6 of contactor $C^n$, and wire 48 to terminal $X^1$. When contacts 7 and 8 of contactor $C^n$ become closed, a circuit for motor M is completed which passes from terminal $B^1$, through wire 54, contact 7 of contactor $C^n$, wires 55 and 33, armature 1 of motor M, wires 32 and 56, contact 8 of contactor $C^n$, wire 57, heating element 18 of thermal relay $T^n$, wires 58 and 37, field winding 2 of motor M, and wire 38 to terminal $X^1$. Motor M then restores switch S to its normal position. When the switch reaches its full normal position, contact 9—$9^a$ of circuit controller E opens and deenergizes contactor $C^n$. When contactor $C^n$ becomes deenergized, the contactor opens its contacts and interrupts the circuit just traced for motor M, so that the motor stops, and the parts are then restored to the position in which they are illustrated in the drawings.

If, for any reason, the motor current rises above the normal value while switch S is being moved from one extreme position to the other extreme position, the motor will be deenergized automatically, so that damage to the motor will be prevented. For example, I will assume that the motor current rises above the normal value when switch S is being moved from its normal to its reverse position due, for example, to the movement of the switch being arrested by some obstruction before the switch reaches its full reverse position. As pointed out hereinbefore, when switch S is being moved from its normal to its reverse position, motor M is energized over a circuit which includes contacts 7 and 8 of contactor $C^r$ and heating element 18 of thermal relay $T^r$. It will be apparent, therefore, that when the motor current rises above the normal value under the above conditions, bimetallic strip 17 of thermal relay $T^r$ becomes heated, and the end of the strip 17 deflects upwardly, thereby opening contact 17—$17^a$ of this relay, thus interrupting the circuit for winding 6 of contactor $C^r$. Contactor $C^r$ therefore becomes deenergized and thus deenergizes motor M.

After motor M has been deenergized in this manner, motor M can not again be energized in the direction to move switch S towards its reverse position until thermal relay $T^r$ has cooled sufficiently to close its contact 17—$17^a$ and contact 25—$25^a$ of circuit controller E has been closed, because, when contact 25—$25^a$ is open, the pick-up circuit for winding 5 of contactor $C^r$ is interrupted and when contact 17—$17^a$ is open, the circuit for winding 6 is interrupted. In order to close contact 25—$25^a$ of circuit controller E it is necessary to energize contactor $C^n$, which can only be done by reversing relay R to close its normal contact 23—$23^a$.

In similar manner, if the motor current rises above its normal value when switch S is being moved from its reverse to its normal position, bimetallic strip 17 of thermal relay $T^n$ deflects upwardly, and deenergizes contactor $C^n$, thereby deenergizing motor M. Motor M can not then again be energized in the direction to move switch S towards its normal position until bimetallic strip 17 of thermal relay $T^n$ cools and closes its contact 17—$17^a$, and until relay R is reversed to energize contactor $C^r$, and thus close contact 46—$46^a$ of contactor $C^n$. For, when contact 17—$17^a$ of thermal relay $T^n$ is open, winding 6 is deenergized and when contact 46—$46^a$ of circuit controller G is open, the pick-up circuit for the normal contactor $C^n$ is interrupted so that contactor $C^n$ can not be energized.

Referring now to Fig. 2 of the drawings, the contactors $C^n$ and $C^r$ as here shown comprise, in addition to armature 3, an independent armature 11 which operates a contact 11—$11^a$. The armature 11 is so designed that it will close contact 11—$11^a$ when a relatively small amount of energy is supplied to winding 5 from the line wires, the increased energy required for operating armature 3 being furnished to winding 6 from a local source. This feature permits operation of controller D from a given source over line wires of greater resistance.

As now shown, the circuit controller G comprises an additional contact arm 12 which closes contacts 12—$12^a$ and 12—$12^b$, allowing control of the switch S to be maintained by controller D should switch S or controller G be operated manually to a position out of correspondence with the position of contact arm 23 on polarized control relay R, as will be shown hereinafter.

I will now assume that with the parts in the positions as shown in Fig. 2 of the drawings, the train despatcher wishes to reverse switch S. To do this, he reverses relay R so that relay R opens its normal contact 23—$23^a$ and closes its reverse contact 23—$23^b$. Contact 25—$25^a$ of circuit controller G being closed, winding 5 of contactor $C^r$ is supplied with current over the same circuit which was described in connection with Fig. 1. The energy received by winding 5 is insufficient to close armature 3 of contactor $C^r$ but is sufficient to close armature 11, thereby closing contact 11—$11^a$ of contactor $C^r$. As soon as contact 11—$11^a$ closes, a circuit is closed for energizing winding 6 of contactor $C^r$ which may be traced from one terminal $B^1$ of a local source, wire 28, contact 11—$11^a$, winding 6 of contactor $C^r$, wire 59, contact 17—$17^a$ of thermal relay $T^r$, wire 29, wire 40, contact 10—$10^a$ of circuit controller E, and wire 60 to the other terminal $X^1$ of the source. When winding 6 is energized, armature 3 of contactor $C^r$ closes, opening contact 25—$25^a$ to deenergize winding 5, but winding 6 remains energized by virtue of the stick circuit just traced, and the energy supplied to winding 6 is sufficient to maintain both armatures 3 and 11 in the closed position. The closing of armature 3 closes contacts 7 and 8 of contactor C$^r$ which complete the circuit for motor M which reverses the switch S as described hereinbefore. When the switch has been reversed, both the motor circuit and winding 6 of contactor C$^r$ become deenergized due to opening of contact 10—10$^a$ of controller E. All parts are then deenergized.

If, after the switch has reached its full reverse position, the train despatcher wishes to restore the switch to its normal position, he restores relay R to its normal position in which it is illustrated in the drawings. As contact 46—46$^a$ of controller G is now closed, it follows that contactor C$^n$ may be energized in a manner similar to that just described in connection with contactor C$^r$, resulting in rotation of the motor in the opposite direction and in restoring of the switch to its normal position.

Thermal overload protection is obtained in connection with Fig. 2 in a manner analogous to that described in connection with Fig. 1 because the opening of contact 17—17$^a$ interrupts the stick circuit for winding 6, deenergizing the motor circuit, which cannot subsequently become energized until relay R is reversed.

I will now assume that with the contacts of relay R and controller G occupying the reverse position, switch S is operated manually to its normal position, shown in the drawings, out of correspondence with the position of contact arm 23 of relay R and position of controller G. Contact 10—10$^a$ of controller E is therefore closed and contact 10—10$^b$ is open. To bring the parts in correspondence with each other, the operator reverses relay R so that contact 23—23$^b$ opens and contact 23—23$^a$ closes. Closing of contact 23—23$^a$ energizes winding 5 of contactor C$^n$ over contact 46—46$^a$ now closed, which results in closing of contact 11—11$^a$. Winding 6 of contactor C$^n$ is now energized over a circuit starting at one terminal B$^1$, wire 53, contact 11—11$^a$, winding 6 of contactor C$^n$, wire 49, thermal relay contact 17—17$^a$, wire 50, wire 42, contact 12—12$^b$, and wire 41 to the other terminal X$^1$ of the source. Armature 3 of contactor C$^n$ now closes and opens contact 12—12$^b$, interrupting the circuit for winding 6, but the controller G is so designed that the impulse of current received in this manner by winding 6 is sufficient to operate lock bar 13 which reverses controller G, opening contact 46—46$^a$ and closing contact 25—25$^a$ before armature 3 drops due to interruption of the circuit for winding 6 at contact 12—12$^b$. All parts are now returned to the position shown in the drawings.

It will be apparent from the above that contacts 12—12$^a$ and 12—12$^b$ provide a means for maintaining control of the switch by relay R and for restoring the control elements in correspondence with each other and with the switch after manual reversal of the switch to an extreme position. Should the switch remain in some intermediate position as a result of manual operation, contacts 10—10$^a$ and 10—10$^b$ of controller E will be closed and a reversal of relay R will cause the motor to operate the switch to a position in correspondence with the position of contact arm 23 of relay R. This feature is common to both Fig. 1 and Fig. 2 of the drawings. If the controller G is manually reversed from the position shown in Fig. 1 or Fig. 2, a first reversal of relay R will not have any effect on controller G because contact 25—25$^a$ will be open. However, the next reversal of relay R, which restores contact arm 23 of relay R to the position shown in the drawings, will cause a reversal of controller G to the normal position by virtue of contact 46—46$^a$ being closed, so that all parts will again be restored to the normal position, as shown.

It follows that control of the switch is maintained by relay R after manual operation of either the switch S or controller G.

While I have illustrated motor control apparatus embodying my invention as applied to the control of a motor for operating a railway switch, it will be readily understood that apparatus embodying my invention is not limited to this use, but may be applied to the control of any reversible motor for operating any movable device.

Although I have herein shown and described only two forms of motor control apparatus embodying my invention, it is understood that various changes and modifications may be made therein within the scope of the appended claims without departing from the spirit and scope of my invention.

Having thus described my invention, what I claim is:

1. In combination, a movable device, an electric motor for operating said device; two contactors, each comprising a pick-up winding for operating the contactor and a holding winding for retaining the contactor in its operated condition; a first circuit controller operated by said device for selectively energizing said holding windings, a second circuit controller operated by both said contactors for selectively energizing said pick-up windings, and means controlled by said contactors for energizing said motor.

2. In combination, an electric motor; two contactors, each comprising a pick-up winding for operating the contactor and a holding winding for retaining the contactor in its operated condition; a circuit controller operated by both said contactors, means including said circuit controller for selectively energizing said pick-up windings, means for selectively energizing said holding windings, and means controlled by said contactors for energizing said motor.

3. In combination, an electric motor, a first and a second pick-up winding, a holding winding, means effective when said holding winding is energized for supplying said motor with current to operate said motor in one direction, a first contact controlled by both said pick-up windings in such manner that said first contact becomes closed when said second pick-up winding is energized and subsequently remains closed until just after said first pick-up winding is energized, a normally closed contact arranged to be opened if the current supplied to said motor when said holding winding is energized exceeds a predetermined value, means including said first contact for at times energizing said first pick-up winding, means including said normally closed contact and effective after said first pick-up winding is energized for energizing said holding winding, and means for at other times energizing said second pick-up winding.

4. In combination, an electric motor, a first and a second pick-up winding, a holding winding, a circuit for energizing said holding winding, means effective when said holding winding is energized for supplying said motor with current to operate said motor in one direction, a first contact controlled by both said pick-up windings in such manner that said first contact becomes closed when said second pick-up winding is energized and subsequently remains closed until just after said first pick-up winding is energized, other means responsive to the magnitude of the current supplied to said motor when said holding winding is energized for controlling the circuit for said holding winding, means including said first contact for at times energizing said first pick-up winding, means effective when said first pick-up winding is energized for energizing the circuit for said holding winding, and means for at other times energizing said second pick-up winding.

5. In combination, an electric motor; two contactors, each comprising a pick-up winding for closing the contactor and a holding winding for maintaining the contactor in its closed condition; a circuit controller operated by both said contactors, manually controlled means including said circuit controller for selectively energizing said pick-up windings, means effective when one or the other of said pick-up windings is energized for energizing the holding winding associated therewith, and means controlled by said contactors for energizing said motor.

6. In combination, a device capable of assuming a first or a second position, an electric motor for operating said device, a first contact controlled by said device and arranged to be closed at all times except when said device occupies its second position, a second contact controlled by said device and arranged to be closed at all times except when said device occupies its first position, a first contactor comprising a first pick-up winding for closing said first contactor and a first holding winding for maintaining said first contactor in its closed condition, a second contactor comprising a second pick-up winding for closing said second contactor and a second holding winding for maintaining said second contactor in its closed condition, a third contact controlled by both said contactors in such manner that said third contact becomes closed when said second pick-up winding is energized and subsequently remains closed until just after said first pick-up winding is energized, a fourth contact controlled by both said contactors in such manner that said fourth contact becomes closed when said first pick-up winding is energized and subsequently remains closed until just after said second pick-up winding is energized, a first normally closed contact included in the circuit for said first holding winding and arranged to be opened if the current supplied to said motor when said first holding winding is energized exceeds a predetermined value, a second normally closed contact included in the circuit for said second holding winding and arranged to be opened if the current supplied to said motor when said second holding winding is energized exceeds a predetermined value, manually controlled means including said third contact for at times energizing said first pick-up winding, manually controlled means including said fourth contact for at other times energizing said second pick-up winding, means for preventing the simultaneous closing of said first and said second contactors, means controlled by said first contactor for energizing said motor to move said device from its first to its second position, and means controlled by said second contactor for energizing said motor to move said device from its second to its first position.

7. In combination, an electric motor, a first and a second pick-up winding, a first and a second operating winding, means effective when said first or said second pick-up winding is energized for energizing said first or said second operating winding respectively, a circuit controller governed by both said operating windings, means including said circuit controller for selectively energizing said pick-up windings, and means controlled by said operating windings for energizing said motor.

8. In combination, an electric motor; a first contactor comprising a first pick-up winding, a first operating winding, a first auxiliary armature controlled by said first pick-up winding and a first main armature controlled by said first operating winding; a second contactor comprising a second pick-up winding, a second operating winding, a second auxiliary armature controlled by said second pick-up winding and a second main armature controlled by said second operating winding; a circuit controller operated by both said first and said second main armatures, a first contact governed by said first auxiliary armature for controlling the energization of said first operating winding, a second contact governed by said second auxiliary armature for controlling the energization of said second operating winding, means including said circuit controller for selectively energizing said pick-up windings, and means controlled by said first and said second main armatures for energizing said motor.

9. In combination, a movable device, an electric motor for operating said device, a first contactor comprising a first pick-up winding and a first operating winding, a second contactor comprising a second pick-up winding and a second operating winding; a first circuit controller operated by said device comprising a first contact in series with said second operating winding and arranged to be closed at all times except when said device occupies its second position, and a second contact in series with said first operating winding and arranged to be closed at all times except when said device occupies its first position; a second circuit controller operated by both said contactors comprising a third and a fourth contact which become closed when said second operating winding is energized and subsequently remain closed until just after said first operating winding is energized, said fourth contact acting when closed to short-circuit said second contact, and a fifth and a sixth contact which become closed when said first operating winding is energized and subsequently remain closed until just after said second operating winding is energized, said sixth contact acting when closed to short-circuit said first contact; means including said third contact for at times energizing said first pick-up winding, means including said fifth contact for at other times energizing said second pick-up winding, and means controlled by said operating windings for energizing said motor.

10. In combination, a device capable of assuming a first or a second position, an electric motor for at times operating said device, means for at other times manually operating said device, a first and a second pick-up winding, a first and a second operating winding, means for energizing said first or said second operating winding when said first or said second pick-up winding is energized respectively; a first circuit controller operated by said device comprising a first contact in series with said second operating winding arranged to be closed at all times except when said device occupies its second position, and a second contact in series with said first operating winding arranged to be closed at all times except when said device occupies its first position; means for short-circuiting said first contact effective when said device is manually operated to its second position, means for short-circuiting said second contact effective when said device is manually operated to its first position, a second circuit controller governed by both said operating windings, manually controlled means including said second circuit controller for selectively energizing said pick-up windings, and means controlled by said operating windings for energizing said motor.

11. In combination, a device capable of assuming a first or a second position, an electric motor for at times operating said device, means for at other times manually operating said device, a first winding effective when energized to cause said motor to move said device from its first to its second position, a second winding effective when energized to cause said motor to move said device from its second to its first position; a first circuit controller operated by said device comprising a first contact in series with said second winding arranged to be closed at all times except when said device occupies its second position, and a second contact in series with said first winding arranged to be closed at all times except when said device occupies its first position; means for short-circuiting said first contact effective when said device is manually operated to its second position, means for short-circuiting said second contact effective when said device is manually operated to its first position, a second circuit controller governed by both said windings, and manually controlled means including said second circuit controller for selectively energizing said windings.

12. In combination, a device capable of assuming a first or a second position, an electric motor for at times operating said device, means for at other times manually operating said device, a first winding effective when energized to cause said motor to move said device from its first to its second position, a second winding effective when energized to cause said motor to move said device from its second to its first position; a first circuit controller operated by said device comprising a first contact in series with said second winding arranged to be closed at all times except when said device occupies its second position, and a second contact in series with said first winding arranged to be closed at all times except when said device occupies its first position; a second circuit controller operated by both said windings, means governed by said second circuit controller for short-circuiting said first contact when said device is manually operated to its second position, means governed by said second circuit controller for short-circuiting said second contact when said device is manually operated to its first position, and manually controlled means including said second circuit controller for selectively energizing said windings.

In testimony whereof I affix my signature.

CLARENCE W. DALZELL.